United States Patent [19]
Ono

[11] Patent Number: 5,899,293
[45] Date of Patent: May 4, 1999

[54] HYDRAULIC POWER STEERING DEVICE

[75] Inventor: Fumiyoshi Ono, Kashihara, Japan

[73] Assignee: Koyo Seiko Co., Ltd., Osaka, Japan

[21] Appl. No.: 08/790,857

[22] Filed: Feb. 3, 1997

[30] Foreign Application Priority Data

Feb. 7, 1996 [JP] Japan .................................. 8-046793

[51] Int. Cl.⁶ .................................................. B62D 5/08
[52] U.S. Cl. ........................ 180/441; 91/375 A; 384/585
[58] Field of Search .................................... 180/417, 421,
180/422, 423, 441, 427; 91/375 A; 384/584,
585, 538

[56] References Cited

U.S. PATENT DOCUMENTS

| | | | |
|---|---|---|---|
| 567,150 | 9/1896 | Mattison | 384/271 |
| 2,895,771 | 7/1959 | Ridgeway | 384/585 |
| 3,602,255 | 8/1971 | Bishop | 91/375 A |
| 4,381,799 | 5/1983 | Sato et al. | 91/375 A |
| 4,759,420 | 7/1988 | Schipper, Jr. et al. | |
| 5,058,695 | 10/1991 | Terada | 180/417 |
| 5,097,869 | 3/1992 | Emori | 91/375 A |
| 5,156,228 | 10/1992 | Kato et al. | 180/417 |
| 5,538,096 | 7/1996 | Breitweg | 180/441 |

FOREIGN PATENT DOCUMENTS 0 654 392 A1  5/1995  European Pat. Off. .
2 119 728  11/1983  United Kingdom .

Primary Examiner—Kevin Hurley
Attorney, Agent, or Firm—Thelen Reid & Priest LLP

[57] ABSTRACT

A portion of an oil path between an actuator for generating steering assistance power and a pump is formed by the inside space S in a housing covering an input shaft. A bearing assembly supporting the input shaft in the inside space has a bearing joined to one of the outer and inner circumferences of a circular spacer, and is inserted between the outer circumference of the input shaft and the inner circumference of the housing via radial clearances. The displacement of the bearing assembly toward one axial direction can be restrained by the contact between the contact portion formed on the other of the circumferences of the spacer and the receiving portion formed on either the housing or the input shaft, and the bearing assembly is pressed toward one axial direction by the oil pressure in the inside space.

5 Claims, 6 Drawing Sheets

Prior Art

HYDRAULIC POWER STEERING DEVICE

FIELD OF THE INVENTION

The present invention relates to a hydraulic power steering device wherein an input shaft constituting a portion of a steering shaft is supported by a bearing assembly in a housing.

DESCRIPTION OF RELATED ART

The conventional hydraulic power steering device 100 illustrated in FIG. 6 comprises an input shaft 101 constituting a portion of a steering shaft, a full type roller bearing 102 supporting the outer circumference of one end side of the input shaft 101, an output shaft 103 joined to the other end side of the input shaft 101 so as to be elastically rotatable relative to the input shaft 101, a pinion 104 provided on the output shaft 103, a rack 105 meshed with the pinion 104, a hydraulic (oil pressure) control valve 106, a pinion housing 107 covering the pinion 104, and a valve housing 109 covering the oil pressure control valve 106. The steering resistance transmitted via the rack 105 and the pinion 104 causes relative rotation between both shafts 101 and 103. The hydraulic control valve 106 controls the pressure of the oil supplied from a pump 111 to a hydraulic actuator 110 for generating steering assistance power according to the relative rotation.

In the assembling process of the above-described hydraulic power steering device 100, the outer circumference of the bearing 102 supporting the input shaft 101 is pressed into the inner circumference of the valve housing 109 from below in FIG. 6. Next, the assembly of the input shaft 101 and the hydraulic control valve 106 is inserted into the valve housing 109 from below in FIG. 6, so that the input shaft 101 is inserted into the inner circumference of the bearing 102. Next, after connecting the input shaft 101 with the output shaft 103, the output shaft 103 is inserted into the pinion housing 107 from above in FIG. 6. The valve housing 109 and the pinion housing 107 are then joined by means of a bolt 115.

In the above-described hydraulic power steering device 100, the pinion housing 107 and the valve housing 109 are separately shaped, resulting in increased numbers of parts and assembling steps and hence increased production cost.

To cope with this problem, a hydraulic power steering device 101' shown by FIG. 5 is used. This device 101' comprises a monolithic housing 121, which has a portion covering the pinion 104 and another portion covering the hydraulic control valve 106, instead of the pinion housing 107 and the valve housing 109.

In the hydraulic power steering device 101' illustrated in FIG. 5, the bearing 102' supporting one end side of the input shaft 101 is a ball bearing. The input shaft 101 is pressed into the inner circumference of the bearing 102'. In the assembling process of this hydraulic power steering device, the input shaft 101 is pressed into the inner circumference of the bearing 102', and also the hydraulic control valve 106 is attached to the input shaft 101. Next, the output shaft 103 is joined to the input shaft 101. The assembly of the input shaft 101, the bearing 102', the oil pressure control valve 106 and the output shaft 103 is then inserted into the housing 121 from above in FIG. 5.

In the assembling process of the above-described conventional hydraulic power steering devices 100, 101', a step for pressing the bearing 102, 102' supporting one end side of the input shaft 101 to the valve housing 109 or to the input shaft 101 is necessary. This in turn complicates the assembling process.

As a solution of this problem, it is considerable to obviate the press fit step by inserting the bearing to the valve housing and input shaft via radial clearances. However, the bearing cannot be fixed to the housing and also to the input shaft when it is merely inserted via the radial clearances, whereby the bearing is instable against the housing and the input shaft. Therefore, the smooth rotation of the input shaft is interfered by the increased inclination of the axis of the input shaft.

Also, the bearing is subject to limitation in design freedom because its dimensions are normally required to meet the standard such as JIS, or the like. For this reason, if two or more different types of bearings are concerned, e.g., the above-described full type roller bearing 102 and the ball bearing 102', occasionally they can not have a same inner diameter meeting such standard. In such case, initial cost reduction is interfered because the input shaft 101 can not be standardized.

In addition, the full type roller bearing 102 and the ball bearing 102' are relatively expensive.

The object of the present invention is to provide a hydraulic power steering device free from the above-described problems.

SUMMARY OF THE INVENTION

The hydraulic power steering device according to the present invention comprises a housing covering an input shaft constituting a portion of a steering shaft, the housing having an inside space, which forms a portion of an oil path between a hydraulic actuator for generating steering assistance power and a pump; wherein a bearing assembly supporting the input shaft is arranged in the inside space of the housing; the bearing assembly has a circular spacer, which has outer and inner circumferences, and a bearing, which is joined to one of the circumferences of the spacer; the bearing assembly is inserted between the outer circumference of the input shaft and the inner circumference of the housing via radial clearances; a contact portion, which can axially come in contact with a receiving portion formed on either the housing or the input shaft, is formed on the other of the circumferences of the spacer so that the displacement of the bearing assembly toward one axial direction can be restrained; and the pressure receiving area of the bearing assembly at one axial end is set smaller than the pressure receiving area of the bearing assembly at the other axial end so that the bearing assembly can be pressed toward the one axial direction by oil pressure in the inside space.

According to the present invention, there is no need to press fit the bearing assembly to the input shaft nor to the housing because the bearing assembly is inserted between the outer circumference of the input shaft and the inner circumference of the housing via radial clearances.

Moreover, the bearing assembly is pressed against the receiving portion formed on either the housing or the input shaft via the contact portion by being pressed toward one axial direction based on oil pressure in the inside space constituting a portion of the oil path in the housing. The bearing assembly can therefore be fixed to either the housing or the input shaft, whereby the inclination of the axis of the input shaft supported by the bearing assembly is prevented from increasing.

Also, the bearing assembly has the circular spacer and the bearing joined to either of the outer and inner circumferences of this spacer. The spacer's dimensions are not subject to limitation by any standard, whereby design freedom is increased to ensure component standardization. Because the spacer's dimensions can be set freely, the freedom of choice of dimensions and types of the bearing constituting the bearing assembly is increased, allowing the choice of a relatively inexpensive bearing.

In summary, according to the hydraulic power steering device of the present invention, the bearing assembly permits high design freedom. Also, the bearing assembly is fixed to a position by oil pressure, thus obviating the necessity of press fit step. Since the input shaft is supported by the bearing assembly, smooth rotation of the input shaft is ensured, the assembling process is simplified, and the required cost is reduced.

In the hydraulic power steering device of the present invention, it is preferable that one end of the input shaft protrudes from an opening on one end of the housing, an output shaft is joined to the other end side of the input shaft so as to be elastically rotatable relative to the input shaft, the output shaft is provided with a pinion meshed with a rack in the housing, a hydraulic control valve for controlling the pressure of the oil supplied to the actuator according to the relative rotation of both shafts based on the steering resistance transmitted via the rack and pinion is provided to both shafts in the housing, the housing is monolithic and has a portion covering the pinion and another portion covering the hydraulic control valve, the bearing assembly is arranged nearer to the one end of the input shaft than the hydraulic control valve is arranged, and the displacement of the bearing assembly toward the other end of the input shaft can be restrained by pressing the bearing assembly against the receiving portion via the contact portion.

According to this constitution, the housing is monolithic and has a portion covering the pinion and another portion covering the oil pressure control valve. This arrangement reduces the numbers of parts and assembling steps, and hence reduces production cost, in comparison with the case wherein the housing is made of separately shaped plural parts. Also, according to this constitution, the bearing assembly is arranged nearer to one end of the input shaft than the hydraulic control valve is arranged, and the input shaft is pressed against the receiving portion via the contact portion so that the displacement of the input shaft toward the other end is restrained. This makes it possible to insert the bearing assembly between the input shaft and the housing from the opening on the one end of the housing, after the assembly constructed of the input shaft, the output shaft, and the hydraulic control valve is inserted into the housing from the opening, whereby the assembling is facilitated.

In the present invention, it is preferable that the bearing is joined to the inner circumference of the spacer, the contact portion is formed on the outer circumference of the spacer, and the receiving portion is formed on the housing. By this arrangement, the bearing can be made compact.

It is preferable that the pressure receiving area of the bearing assembly at the one axial end near to the other end of the input shaft is set smaller than the pressure receiving area of the bearing assembly at the other axial end near to the one end of the input shaft, by restraining the displacement of the bearing assembly via face contact of the contact portion with the receiving portion. Alternatively, it is preferable that the displacement of the bearing assembly is restrained by line contact of the contact portion with the receiving portion, and the pressure receiving area of the bearing assembly at one axial end near to the other end of the input shaft is set smaller than the pressure receiving area of the bearing assembly at the other axial end near to the one end of the input shaft, by narrowing the radial clearance communicating with the line contact portion so as to prevent the flow of the hydraulic oil in the radial clearance. As the result, the difference between the pressure receiving areas can be easily created.

DETAILED DESCRIPTION OF PREFERRED EMBODIMENTS

Embodiments of the present invention is hereinafter described with reference to FIGS. 1 through 4.

Figure 1:
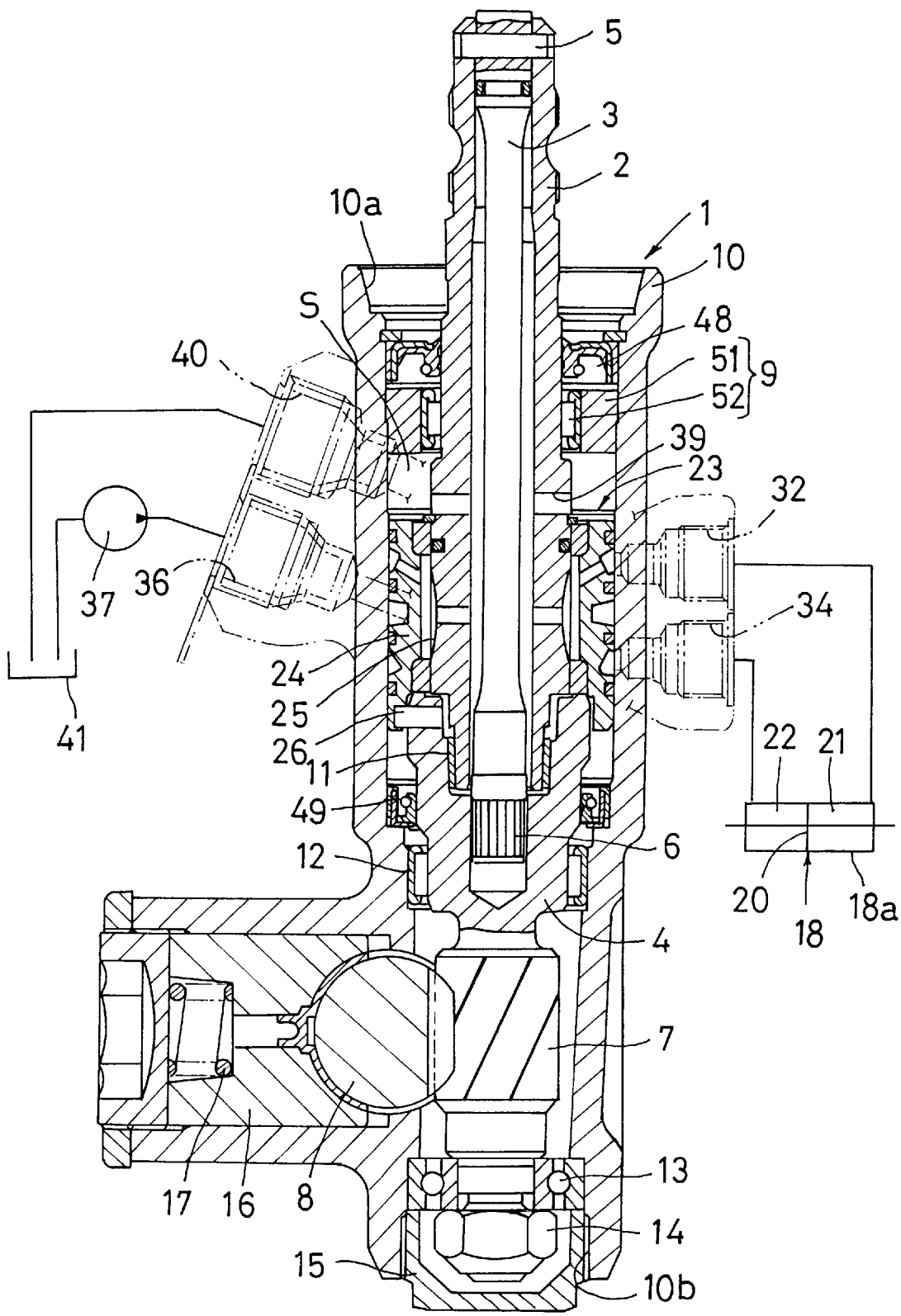
FIG. 1 is a longitudinal cross-sectional view of the hydraulic power steering device of an embodiment of the present invention.

The rack and pinion type power steering device 1 illustrated in FIG. 1 comprises an input shaft 2 and an output shaft 4, each of which constitutes a portion of a steering shaft, and a housing 10 covering both shafts 2 and 4.

A torsion bar 3 is inserted into the input shaft 2. One end side of the torsion bar 3 is attached to one end side of the input shaft 2 via a pin 5. The other end side of the input shaft 2 is inserted into one end side of the output shaft 4. The other end side of the torsion bar 3 is fitted to one end side of the output shaft 4 via a serration 6. Therefore, the output shaft 4 is joined to the other end side of the input shaft 2 so as to be elastically coaxially rotatable relative to the input shaft 2.

A pinion 7 is provided to the output shaft 4 between both ends of the output shaft 4 in the housing 10. A vehicle wheel (not illustrated) to be steered is joined to each end of a rack 8 meshed with the pinion 7. A support yoke 16 supporting the rack 8 is provided in the housing 10. The support yoke 16 is pressed against the rack 8 by an elastic force generated by a spring 17.

The outer circumference of the input shaft 2 between both its ends is supported by a bearing assembly 9 in the housing 10. One end of the input shaft 2 protrudes from an opening 10a on one end of the housing 10, and is joined to a steering wheel (not illustrated) via a joint etc. The outer circumference of the other end side of the input shaft 2 is supported by a bush 11 fitted into the inner circumference of one end side of the output shaft 4.

The outer circumference of the output shaft 4 between both its ends is supported by a needle roller bearing 12 in the housing 10. The outer circumference of the other end side of the output shaft 4 is supported by a ball bearing 13 in the housing 10. An anti-dropout nut 14 for the ball bearing 13 is screwed to the other end side of the output shaft 4 from an opening 10b on the other end of the housing 10. The opening 10b is closed by a cap 15 screwed therein.

The rotation of the input shaft 2 based on operation of the steering wheel is transmitted to the pinion 7 via the torsion bar 3 and the output shaft 4, so that the rack 8 is moved along longitudinal direction by the rotation of the pinion 7, whereby the vehicle wheels are steered.

As an hydraulic actuator for generating steering assistance power, a hydraulic cylinder 18 is provided. The hydraulic cylinder 18 has a cylinder tube 18a joined to the housing 10 so as to cover the rack 8, a piston 20 joined to the rack 8, a right hydraulic fluid chamber 21 for generating right steering assistance power, and a left hydraulic fluid chamber 22 for generating left steering assistance power, wherein both chamber 21 and 22 are partitioned by the piston 20.

Each of the hydraulic fluid chambers 21 and 22 is connected to a rotary type hydraulic control valve 23, which is provided to the input and output shafts 2, 4 in the housing 10. The housing 10 is monolithic and has a portion covering the control valve 23 and a portion covering the pinion 7. The outer diameter of the control valve 23 is greater than the outer diameter of the pinion 7, and thus the opening 10a on the one end of the housing 10 is greater than the opening 10b on the other end.

The control valve 23 comprises a cylindrical first valve element 24 and a second valve member 25, which inserted into the first valve member 24 so as to be rotatable relative to the first valve member 24. The first valve member 24 is attached to the output shaft 4 via a pin 26 so as to be rotatable together with the output shaft 4. The second valve member 25 is integrated with the outer circumference of the input shaft 2.

Figure 2:
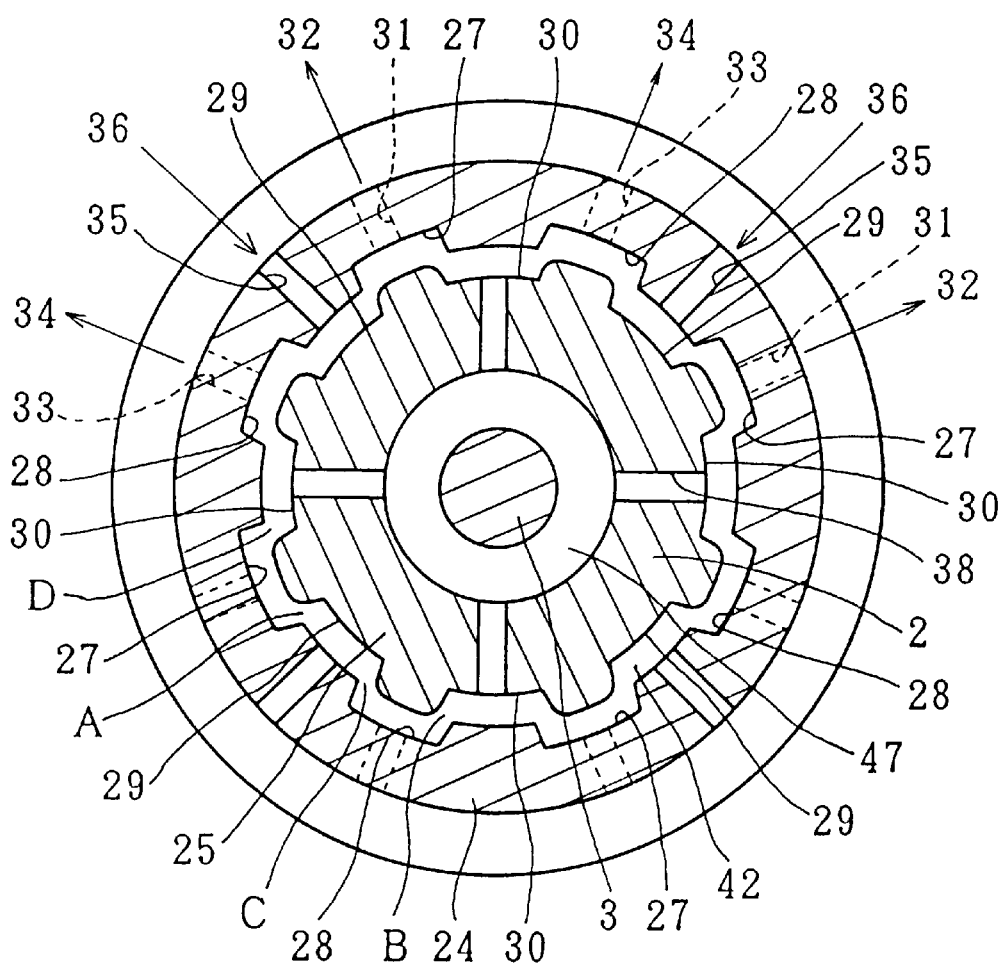
FIG. 2 is a transverse cross-sectional view of a control valve of the hydraulic power steering device of the embodiment.

As shown in FIG. 2, a plurality of axially oriented slots are formed at a given interval around the inner circumference of the first valve member 24 and the outer circumference of the second valve member 25. The slots around the inner circumference of the first valve member 24 comprise four equally spaced right steering slots 27 and four equally spaced left steering slots 28. The slots around the outer circumference of the second valve member comprise four equally spaced hydraulic fluid feed slots 29 and four equally spaced hydraulic fluid drainage slots 30. The right steering slots 27 and the left steering slots 28 are positioned alternately along the circumferential direction. The hydraulic fluid feed slots 29 and the hydraulic fluid drainage slots 30 are positioned alternately along the circumferential direction.

Each of the right steering slots 27 communicate with the right hydraulic fluid chamber 21 of the hydraulic cylinder 18 by way of first flow channels 31, which are formed in the first valve member 24, and a first port 32, which is formed in the housing 10. Each of the left steering slots 28 communicate with the left hydraulic fluid chamber 22 of the hydraulic cylinder 18 by way of second flow channels 33, which are formed in the first valve member 24, and a second port 34, which is formed in the housing 10. The hydraulic fluid feed slots 29 communicate with a pump 37 by way of third flow channels 35, which are formed in the first valve member 24, and an intake port 36, which is formed in the housing 10. The hydraulic fluid drainage slots 30 communicate with a tank 41 by way of first drainage channels 38, which are formed in the second valve member 25, channels 47 formed between the inner circumference of the input shaft 2 and the outer circumference of the torsion bar 3, second drainage channels 39, which are formed in the input shaft 2 as shown in FIG. 1, an inside space S above the first valve member 24 in the housing 10 as shown by the figure, and a drainage ports 40, which is formed in the housing 10. An oil seal 48 is provided between the input shaft 2 and the housing 10 above the inside space S, an oil seal 49 is provided between the output shaft 4 and the housing 10 below the first valve member 24 as shown by figure.

The pump 37, the tank 41 and the hydraulic fluid chambers 21,22 are communicated with each other through the internal flow channel 42 formed between the inner circumference of the first valve members 24 and the outer circumference of the second valve member 25. In the internal flow channel 42 of the control valve 23, the gaps between the slots of the first valve member and the slots of the second valve member 24 form throttling portions A, B, C and D. The gap size, that is, the opening of the throttling portions A, B, C and D can be varied by rotating the first and second valve members 24,25 relative to each other. The pressure of the oil acting on the hydraulic cylinder 18 is varied by varying the opening of the throttling portions A, B, C and D.

FIG. 2 shows the relative positions of the first and second valve members 24,25 when the vehicle is on a straight course and steering operation is not being carried out. In this condition, the hydraulic fluid feed slots 29 and the hydraulic fluid drainage slots 30 are communicated to each other by way of fully opened throttling portions A, B, C and D, so that the oil supplied from the pump 37 is drained straight back into the tank 41. Therefore, no steering assistance power is generated.

When the driver steers the vehicle away from the straight course to the right, the torsion bar 3 is twisted by the steering resistance transmitted via the rack 8 and pinion 7. This twisting motion in turn causes the two valve members 24,25 to rotate relative to each other. As a result, the pressure of the oil supplied to the hydraulic cylinder 18 is controlled by the control valve 23. To be more precise, there is an increase in the opening of the throttling portions A between the right steering slots 27 and the hydraulic fluid feed slots 29 and in the opening of the throttling portions B between the left steering slots 28 and the hydraulic fluid drainage slots 30, and there is a decrease in the opening of the throttling portions C between the left steering slots 28 and the hydraulic fluid feed slots 29 and in the opening of the throttling portions D between the right steering slots 27 and the hydraulic fluid drainage slots 30. Thus, high pressure oil is fed from the pump 37 into one hydraulic fluid chamber 21 at a pressure corresponding to the strength of the steering resistance, and low pressure oil is drained back from the other hydraulic fluid chamber 22 into the tank 41. As a result, steering assistance power to steer the vehicle to the right is applied to the rack 8.

When the driver steers the vehicle away from a straight course to the left, the variation of the opening of the throttling portions A, B, C and D is opposite to that in the case where the vehicle is steered to the right. Thus, the steering assistance power to steer the vehicle to the left is applied to the rack 8.

In the above arrangement, the inside space S is arranged nearer to the one end of the input shaft 2 than the control valve 23 is arranged in the housing 10. The inside space S forms a portion of the oil path between the hydraulic cylinder 18 and the pump 37. The bearing assembly 9 is arranged in the inside space S, which is fully filled with the low pressure oil returnable to the tank 41.

Figure 3:
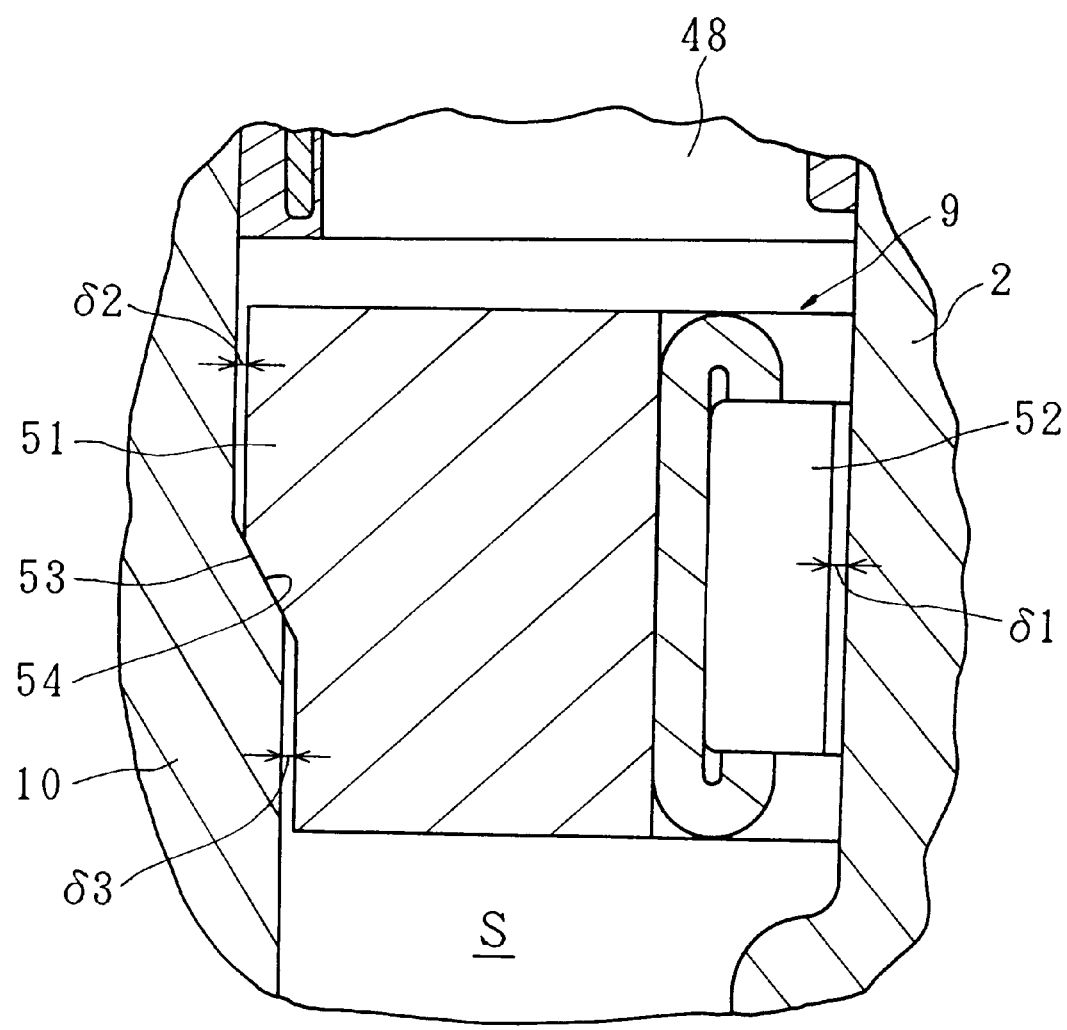
FIG. 3 is a cross-sectional view of the main portion of the hydraulic power steering device of the embodiment.

As illustrated in FIG. 3, the bearing assembly 9 has a circular spacer 51 and a needle roller bearing 52, which is joined to the inner circumference of the spacer 51 by being pressed therein. The spacer 51 can be obtained by, for example, sintering a powdered metal, or molding a metal or synthetic resin. The needle roller bearing 52 can be replaced by an other type bearing, such as a sliding bearing made of a Teflon-coated bush, etc.

The bearing assembly 9 is inserted between the outer circumference of the input shaft 2 and the inner circumference of the housing 10 via radial clearances.

To be more precise, the outer diameter of the input shaft 2 is set smaller than the inner diameter of the needle roller bearing 52 at the position, where the input shaft 2 faces the needle roller bearing 52, and at the one end side of the input shaft 2 beyond that facing position. By this arrangement, a first radial clearance δ1 is formed between the input shaft 2 and the bearing assembly 9.

The outer diameter of the spacer 51 at one end side is set smaller than that at the other end side near to the opening 10a on the one end of the housing 10. The inner diameter of the housing 10 is set greater than the outer diameter of the other end side of the spacer 51 at the position, where the housing 10 faces the other end side of the spacer 51, and at the one end side of the housing 10 beyond that facing position. By this arrangement, a second radial clearance δ2 is formed between the housing 10 and the other end side of the bearing assembly 9.

The inner diameter of the housing 10 is set greater than the outer diameter of the one end side of the spacer 51 at the position where the housing 10 faces the one end side of the spacer 51. By this arrangement, a third radial clearance δ3 is formed between the housing 10 and the one end side of the bearing assembly 9. Each of the clearances δ1, δ2 and δ3 can be, for example, set at about dozens of micrometers. By this constitution, the input shaft 2 is supported by the bearing assembly 9 so as to be capable of floating, and the bearing assembly 9 is supported by the housing 10 so as to be capable of floating.

A contact portion 53 is formed on the outer circumference of the spacer 51 along a conical face like a step between both ends of the spacer 51. A receiving portion 54 is formed on the inner circumference of the housing 10 along a conical face like a step between both ends of the housing 10 facing the spacer 51. The contact portion 53 can axially come in contact with the receiving portion 54 via mutual faces, so that the displacement of the bearing assembly 9 toward one axial direction, that is, toward the other end of the input shaft 2 can be restrained.

The face constituting the contact portion 53 and the face constituting the receiving portion 54 are formed so as to be parallel with each other, so that the face contact of the contact portion 53 with the receiving portion 54 is enabled. The pressure receiving area of the bearing assembly 9 at the one axial end near to the other end of the input shaft 2 is set smaller than the pressure receiving area of the bearing assembly 9 at the other axial end near to the one end of the input shaft 2 via the face contact. By this difference between the pressure receiving areas, the bearing assembly 9 can be pressed toward one axial direction, that is, toward the other end of the input shaft 2 by the oil pressure in the inside space S.

Figure 4:
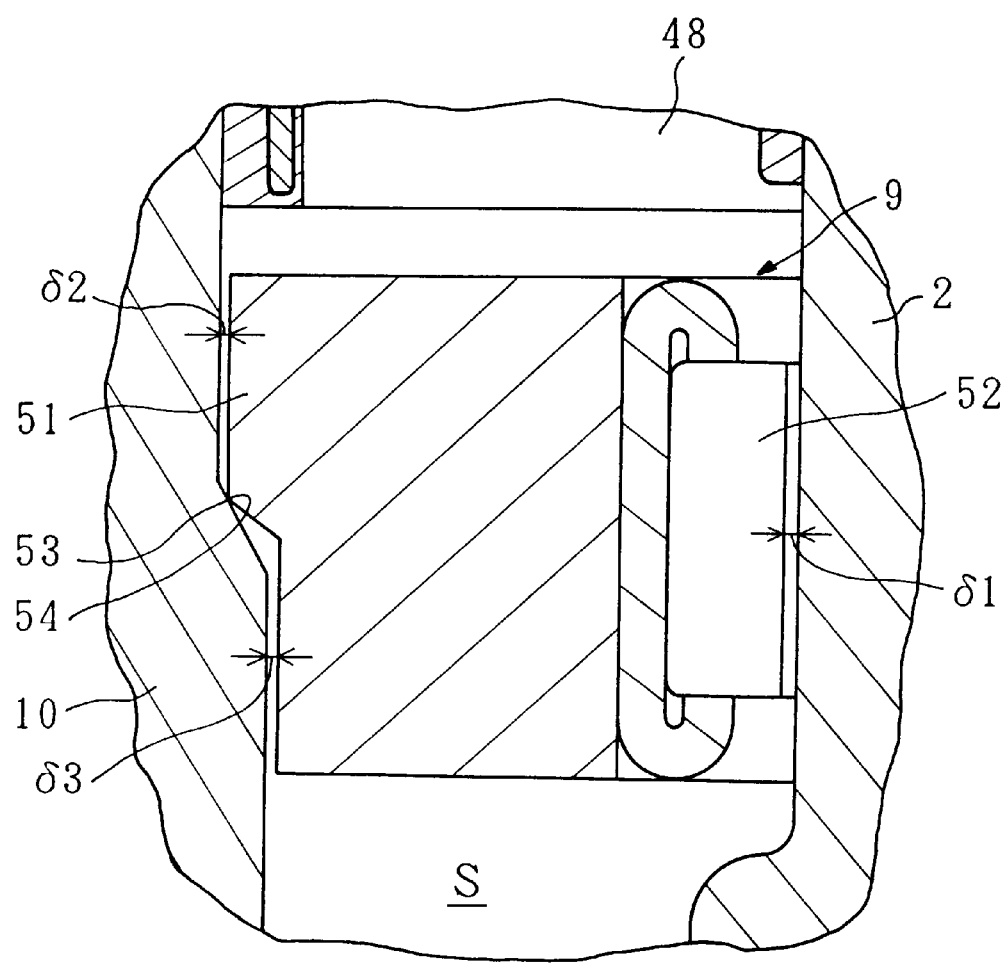
FIG. 4 is a cross-sectional view of a main portion of the hydraulic power steering device of a modified embodiment.
Figure 5:
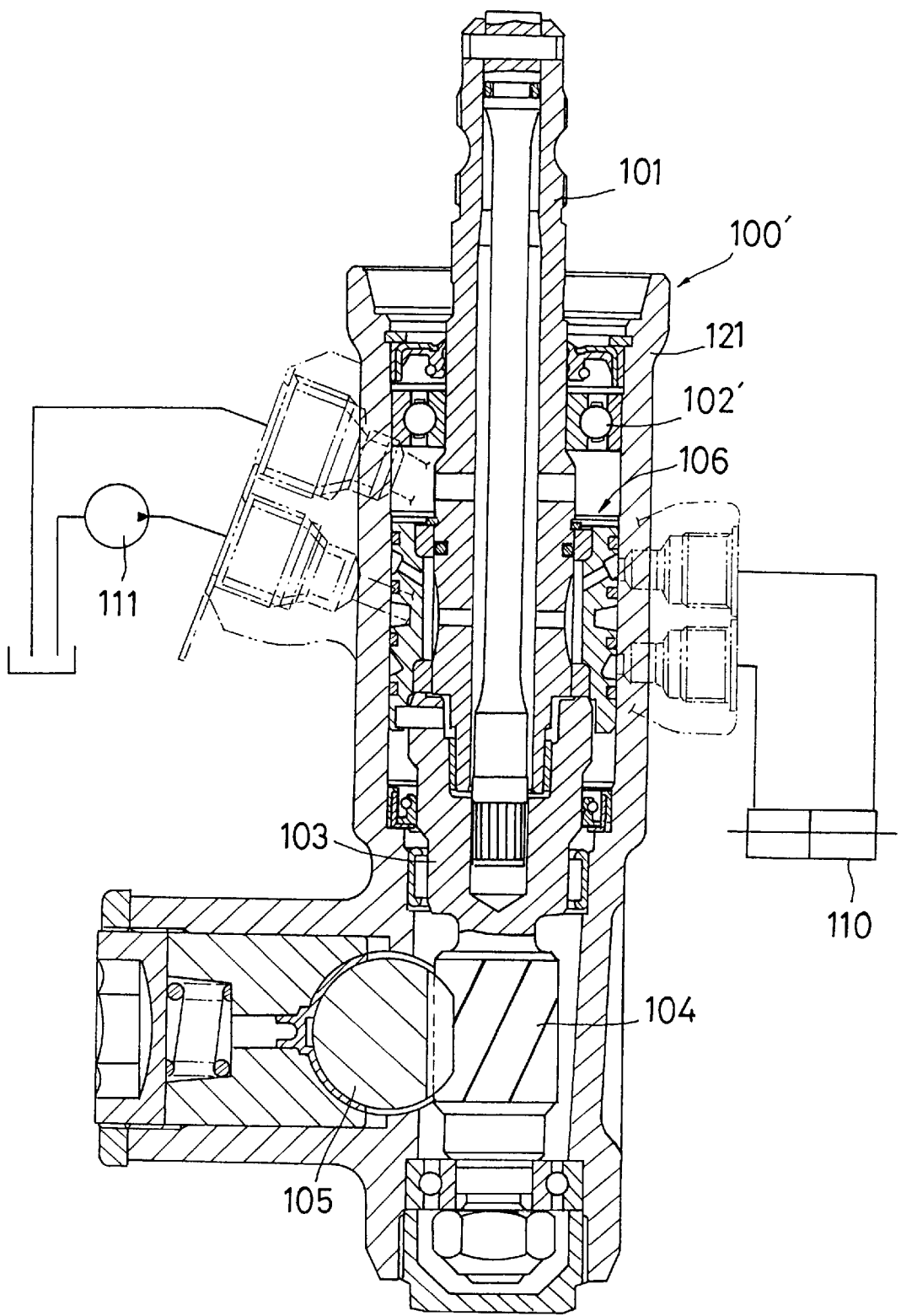
FIG. 5 is a longitudinal cross-sectional view of a conventional hydraulic power steering device.
Figure 6:
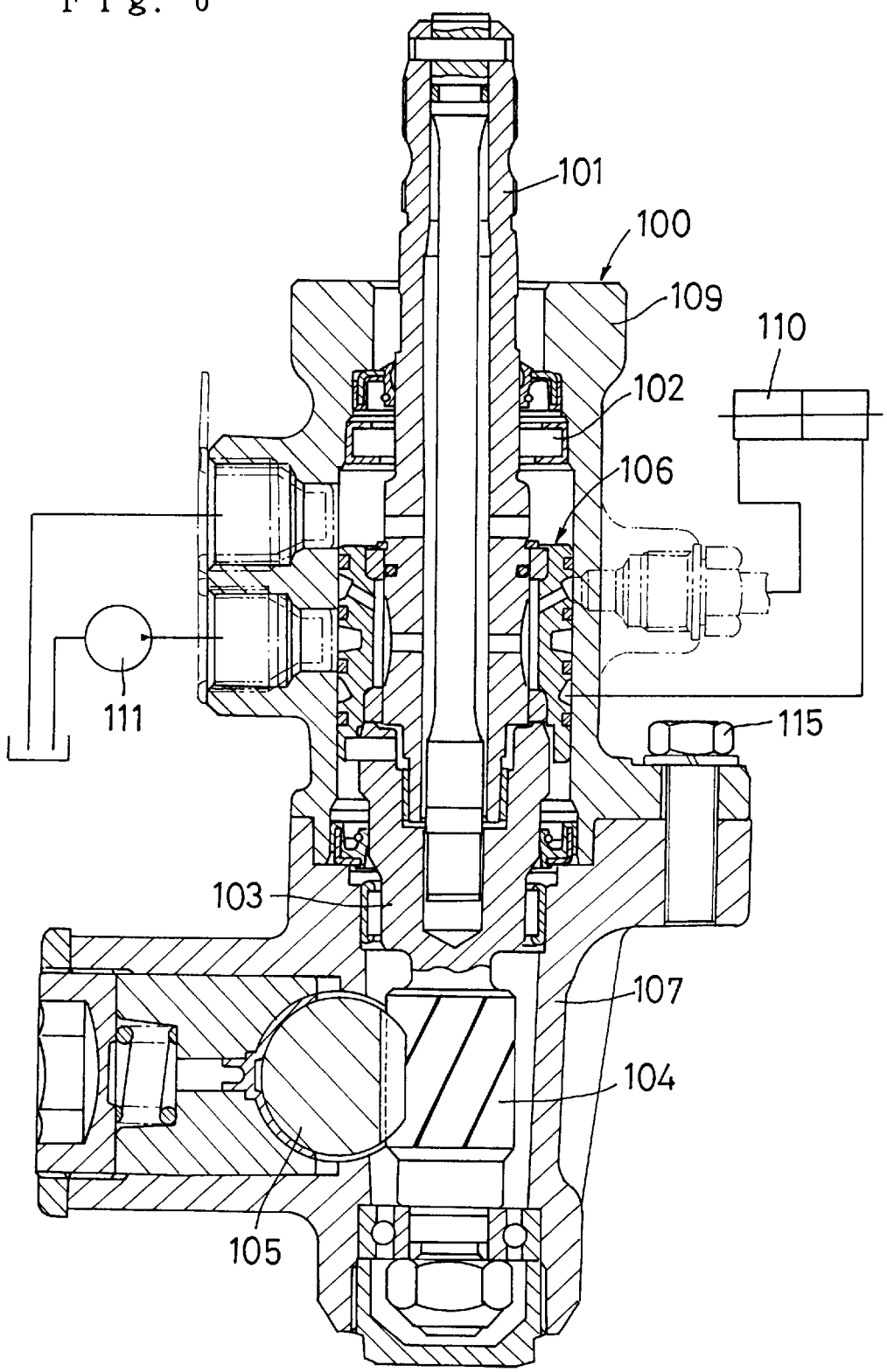
FIG. 6 is a longitudinal cross-sectional view of another conventional hydraulic power steering device.

As illustrated in the modification in FIG. 4, when the third radial clearance δ3 is narrow enough to prevent the flow of hydraulic oil, the displacement of the bearing assembly 9 can be restrained by line contact of the contact portion 53 with the receiving portion 54. This is because the pressure receiving area of the bearing assembly 9 at the one axial end near to the other end of the input shaft 2 can be set smaller than that of the bearing assembly 9 at the other axial end near to the one end of the input shaft 2, by restraining the flow of the hydraulic oil in the third radial clearance δ3 communicating with the line contact portion. In FIG. 4, the same portions as those in FIG. 3 are denoted by the same symbols.

Since the above-described bearing assembly 9 is inserted between the outer circumference of the input shaft 2 and the inner circumference of the housing 10 via radial clearances, there is no need to press fit the bearing assembly 9 to the input shaft 2 nor to the housing 10. Also, the bearing assembly 9 is pressed against the receiving portion 54 on the housing 10 via the contact portion 53 by the pressure of the oil used for generating the steering assistance power, so that the bearing assembly 9 is fixed to a position. Therefore, the inclination of the axis of the input shaft 2 is prevented from increasing, so that smooth rotation of the input shaft 2 is ensured. Also, because the dimensions of the spacer 51 constituting the bearing assembly 9 are not subject to limitation by any standard, design freedom is increased. Therefore, the input shaft 2 can be supported irrespective of its outer diameter, and thus enabling standardization of the input shaft 2. Also, because the dimensions of the spacer 51 can be set freely, the freedom of choice of dimensions and type of the bearing 52 constituting the bearing assembly 9 is increased, thus allowing the choice of a relatively inexpensive bearing as the bearing 52. Therefore, the numbers of parts and assembling steps are reduced so that production cost can be reduced.

Also, because the housing 10 is monolithic and has a portion covering the pinion 7 and another portion covering the control valve 23, the numbers of parts and assembling steps are reduced so that production cost can be reduced, in comparison with the case wherein the housing is made of separately shaped plural parts. It is also possible to insert the bearing assembly 9 between the input shaft 2 and the housing 10 from the opening 10a on the one end of the housing 10, after the assembly constructed of the input shaft 2, the output shaft 4, and the control valve 23 is inserted into the housing 10 via the opening 10a, whereby the assembling is facilitated.

The present invention is not limited to the above-described embodiments. For example, the bearing constituting the bearing assembly can be fitted to the outer circumference of the spacer, and the contact portion can be formed on the inner circumference of the spacer, and the receiving portion can be formed on the outer circumference of the input shaft.

What is claimed is:

1. A hydraulic power steering device, comprising:
  a housing covering an input shaft constituting a portion of a steering shaft, the housing having an inside space which forms a portion of an oil path between a hydraulic actuator for generating steering assistance power and a pump; wherein
  a) bearing assembly supporting the input shaft is arranged in the inside space of the housing;
  b) the bearing assembly has:
    1) a circular spacer which has outer and inner circumferences, and
    2) a bearing that is press fit to a first one of the circumferences of the circular spacer;
  c) the bearing assembly is inserted between the outer circumference of the input shaft and the inner circumference of the housing via radial clearances, so that:
    (1) the input shaft is supported by the bearing assembly so as to be capable of floating; and
    (2) the bearing assembly is supported by the housing so as to be capable of floating,
  d) a contact portion, which can axially come in contact with a receiving portion formed on either the housing or the input shaft, is formed on a second one of the circumferences of the circular spacer so that the displacement of the bearing assembly toward one axial direction can be restrained;

e) the pressure receiving area of the bearing assembly at one axial end is set smaller than the pressure receiving area of the bearing assembly at the other axial end so that the bearing assembly can be pressed toward the one axial direction by oil pressure in the inside space; and f) the bearing assembly is fixed to a position by being pressed to the pressure receiving area by oil pressure.

2. The hydraulic power steering device according to claim 1, wherein:

one end of the input shaft protrudes from an opening on one end of the housing;

an output shaft is joined to the other end side of the input shaft so as to be elastically rotatable relative to the input shaft;

the output shaft is provided with a pinion engaged with a rack in the housing;

a hydraulic control valve for controlling the pressure of the oil supplied to the actuator according to the relative rotation of both shafts based on the steering resistance transmitted via the rack and pinion is provided to both shafts in the housing;

the housing is monolithic and has a portion covering the pinion and another portion covering the hydraulic control valve; and the bearing assembly is arranged nearer to the one end of the input shaft than the hydraulic control valve is arranged, and the displacement of the bearing assembly toward the other end of the input shaft can be restrained by pressing the bearing assembly against the receiving portion via the contact portion.

3. The hydraulic power steering device according to claim 1, wherein:

the bearing is joined to the inner circumference of the spacer, the contact portion is formed on the outer circumference of the spacer, and the receiving portion is formed on the housing.

4. The hydraulic power steering device according to claim 1, wherein:

the pressure receiving area of the bearing assembly at the one axial end near to the other end of the input shaft is set smaller than the pressure receiving area of the bearing assembly at the other axial end near to the one end of the input shaft, by restraining the displacement of the bearing assembly via face contact of the contact portion with the receiving portion.

5. The hydraulic power steering device according to claim 1, wherein:

the displacement of the bearing assembly is restrained by line contact of the contact portion with the receiving portion, and the pressure receiving area of the bearing assembly at one axial end near to the other end of the input shaft is set smaller than the pressure receiving area of the bearing assembly at the other axial end near to the one end of the input shaft, by narrowing the radial clearance communicating with the line contact portion so as to prevent the flow of the hydraulic oil in the radial clearance.

* * * * *